United States Patent
Craske

(10) Patent No.: US 10,394,641 B2
(45) Date of Patent: Aug. 27, 2019

(54) APPARATUS AND METHOD FOR HANDLING MEMORY ACCESS OPERATIONS

(71) Applicant: ARM LIMITED, Cambridge (GB)

(72) Inventor: Simon John Craske, Cambridge (GB)

(73) Assignee: ARM Limited, Cambridge (GB)

( * ) Notice: Subject to any disclaimer, the term of this patent is extended or adjusted under 35 U.S.C. 154(b) by 171 days.

(21) Appl. No.: 15/483,155

(22) Filed: Apr. 10, 2017

(65) Prior Publication Data

US 2018/0293122 A1   Oct. 11, 2018

(51) Int. Cl.
*G06F 11/00* (2006.01)
*G06F 11/07* (2006.01)

(52) U.S. Cl.
CPC .......... *G06F 11/079* (2013.01); *G06F 11/073* (2013.01)

(58) Field of Classification Search
CPC .................................................... G06F 11/079
See application file for complete search history.

(56) References Cited

U.S. PATENT DOCUMENTS

| | | | | |
|---|---|---|---|---|
| 5,961,629 A * | 10/1999 | Nguyen | ............... | G06F 9/30112 710/56 |
| 6,088,773 A * | 7/2000 | Kano | ................... | G06F 11/1407 711/146 |
| 6,230,282 B1 * | 5/2001 | Zhang | ................. | G06F 11/2048 714/13 |
| 2002/0080382 A1 * | 6/2002 | Ohtsu | ................... | G03G 15/55 358/1.14 |
| 2002/0133507 A1 * | 9/2002 | Holenstein | .......... | G06F 11/2064 |
| 2005/0246488 A1 * | 11/2005 | Kiba | .................... | G06F 12/0804 711/113 |

(Continued)

*Primary Examiner* — Christopher S McCarthy
(74) *Attorney, Agent, or Firm* — Nixon & Vanderhye P.C.

(57) ABSTRACT

An apparatus and method are described for handling memory access operations, and in particular for handling faults occurring during the processing of such memory access operations. The apparatus has processing circuitry for executing program instructions that include memory access instructions, and a memory interface for coupling the processing circuitry to a memory system. The processing circuitry is switchable between a synchronous fault handling mode and an asynchronous fault handling mode. When in the synchronous fault handling mode the processing circuitry applies a constraint on execution of the program instructions such that a fault resulting from a memory access operation processed by the memory system will be received by the memory interface before the processing circuitry has allowed program execution to proceed beyond a recovery point for the memory access instruction associated with the memory access operation. In contrast, when in the asynchronous fault handling mode, the processing circuitry removes that constraint. The processing circuitry is then arranged to switch between the synchronous fault handling mode and the asynchronous fault handling mode during execution of the program instructions, in dependence on a current context of the processing circuitry. This enables the apparatus to selectively take advantage of the higher performance associated with asynchronous reporting of faults, and the improved fault handling associated with the synchronous reporting of faults.

15 Claims, 7 Drawing Sheets

(56) References Cited

U.S. PATENT DOCUMENTS

| | | | |
|---|---|---|---|
| 2005/0268073 A1* | 12/2005 | Karp | G06F 9/3842 |
| | | | 712/207 |
| 2008/0320051 A1* | 12/2008 | Murotani | G06F 17/302 |
| 2009/0313311 A1* | 12/2009 | Hoffmann | G06F 11/2094 |
| 2010/0011372 A1* | 1/2010 | Trensch | G06F 9/526 |
| | | | 718/107 |
| 2011/0219280 A1* | 9/2011 | Blumrich | H03M 13/09 |
| | | | 714/748 |
| 2012/0198278 A1* | 8/2012 | Williams | G06F 9/4812 |
| | | | 714/30 |
| 2012/0311303 A1* | 12/2012 | Hansen | G06F 9/30014 |
| | | | 712/200 |
| 2014/0258693 A1* | 9/2014 | Lindholm | G06F 9/38 |
| | | | 712/233 |
| 2015/0379107 A1* | 12/2015 | Rank | G06F 17/30575 |
| | | | 707/611 |
| 2016/0328303 A1* | 11/2016 | Brandner | G06F 11/1662 |
| 2017/0039371 A1* | 2/2017 | Lukacs | G06F 21/53 |
| 2018/0046536 A1* | 2/2018 | Iyigun | G06F 9/45558 |
| 2018/0083729 A1* | 3/2018 | Wang | G06F 9/45558 |
| 2018/0143774 A1* | 5/2018 | Carson | G06F 3/0619 |

* cited by examiner

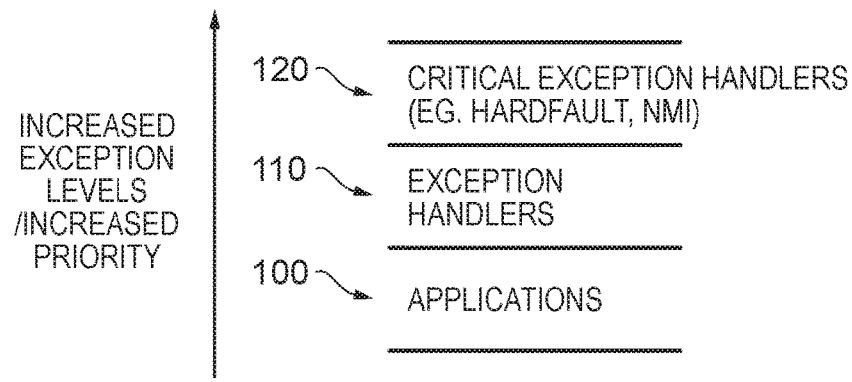

OPTIONS FOR STEP 55 OF FIG. 3

1) $F^n$ (EL) — HARD WIRED FOR EACH EXCEPTION LEVEL TO INDICATE WHETHER ASYNCHRONOUS OR SYNCHRONOUS MODE

2) $F^n$ (EL, CONFIG) — CONFIGURATION BITS SET FOR EACH EXCEPTION LEVEL (EG. IF EL2 AND CONFIG BIT SET FOR EL2, RUN IN SYNCHRONOUS MODE)

3) $F^n$ (CURRENT PRIORITY, CONFIG) — CONFIGURATION FIELD SET TO IDENTIFY PRIORITY LEVEL ABOVE WHICH SYNCHRONOUS MODE IS USED (EG. IF CURRENTLY OPERATING AT PRIORITY LEVEL 7 AND CONFIGURATION FIELD IDENTIFIES PRIORITY LEVEL 6, RUN IN SYNCHRONOUS MODE)

4) $F^n$ (MODE STATE BIT) — STATE BIT UPDATED DURING OPERATION OF CPU (EG. BY RUNNING EXPLICIT SWITCH INSTRUCTIONS, OR AS PART OF EXCEPTION ENTRY/EXIT PROCEDURE)

FIG. 4

APPARATUS AND METHOD FOR HANDLING MEMORY ACCESS OPERATIONS

BACKGROUND

The present technique relates to an apparatus and method for handling memory access operations. In particular, the described techniques relate to the management of faults resulting from the performance of such memory access operations.

Processing circuits such as central processing units (CPUs) are typically built to handle faults in one of two ways. Firstly, they may be constructed such that faults resulting from memory access operations that occur externally to the CPU are reported synchronously, i.e. the processor does not commit execution of instructions beyond the memory access instruction whose associated memory access operation gives rise to the fault. As a result, the processing circuitry can more readily recover from the fault as it still has access to the relevant state information at the time the associated memory access instruction was executed. However, running a CPU in such a synchronous fault handling mode can impact performance, as it adversely affects the rate at which instructions can be executed.

An alternative approach is to execute a CPU such that faults resulting from memory access operations that occur externally to the CPU are reported asynchronously, i.e. an arbitrary number of instructions after the associated memory access instruction was executed. When faults are reported in such an asynchronous manner, the process for recovering from the fault will typically be significantly more onerous, as the CPU may no longer have access to the relevant state existing at the time the corresponding memory access instruction was executed, and hence it may be necessary to restart the entire system. However, on the assumption that such faults occur quite infrequently, asynchronous handling of faults tends to be favoured due to it being simpler and cheaper to implement, and due to it typically resulting in higher throughput of instructions, and accordingly higher performance.

SUMMARY

In one example arrangement, there is provided an apparatus comprising: processing circuitry to execute program instructions including memory access instructions; and a memory interface to couple the processing circuitry to a memory system; the processing circuitry being switchable between a synchronous fault handling mode and an asynchronous fault handling mode, when in the synchronous fault handling mode the processing circuitry applying a constraint on execution of the program instructions such that a fault resulting from a memory access operation processed by the memory system will be received by the memory interface before the processing circuitry has allowed program execution to proceed beyond a recovery point for the memory access instruction associated with said memory access operation, and when in the asynchronous fault handling mode the processing circuitry removing said constraint; the processing circuitry arranged to switch between the synchronous fault handling mode and the asynchronous fault handling mode during execution of the program instructions, in dependence on a current context of the processing circuitry.

In another example arrangement, there is provided a method of handing memory access operations in an apparatus having processing circuitry for executing program instructions including memory access instructions, and a memory interface to couple the processing circuitry to a memory system, the method comprising: providing the processing circuitry with a synchronous fault handling mode and an asynchronous fault handling mode; when in the synchronous fault handling mode, the processing circuitry applying a constraint on execution of the program instructions such that a fault resulting from a memory access operation processed by the memory system will be received by the memory interface before the processing circuitry has allowed program execution to proceed beyond a recovery point for the memory access instruction associated with said memory access operation; when in the asynchronous fault handling mode, the processing circuitry removing said constraint; and switching between the synchronous fault handling mode and the asynchronous fault handling mode during execution of the program instructions, in dependence on a current context of the processing circuitry.

In a yet further example arrangement, there is provided an apparatus comprising: processing means for executing program instructions including memory access instructions; and memory interface means for coupling the processing means to a memory system; the processing means being switchable between a synchronous fault handling mode and an asynchronous fault handling mode, when in the synchronous fault handling mode the processing means applying a constraint on execution of the program instructions such that a fault resulting from a memory access operation processed by the memory system will be received by the memory interface means before the processing means has allowed program execution to proceed beyond a recovery point for the memory access instruction associated with said memory access operation, and when in the asynchronous fault handling mode the processing means removing said constraint; the processing means for switching between the synchronous fault handling mode and the asynchronous fault handling mode during execution of the program instructions, in dependence on a current context of the processing means.

BRIEF DESCRIPTION OF THE DRAWINGS

The present technique will be described further, by way of example only, with reference to embodiments thereof as illustrated in the accompanying drawings, in which:

FIG. 4 schematically illustrates a number of mechanisms that may be used for identifying a current fault handling mode of operation in an apparatus of one embodiment that is able to execute both applications and a number of different exception handlers;

DESCRIPTION OF EMBODIMENTS

Figure 1:
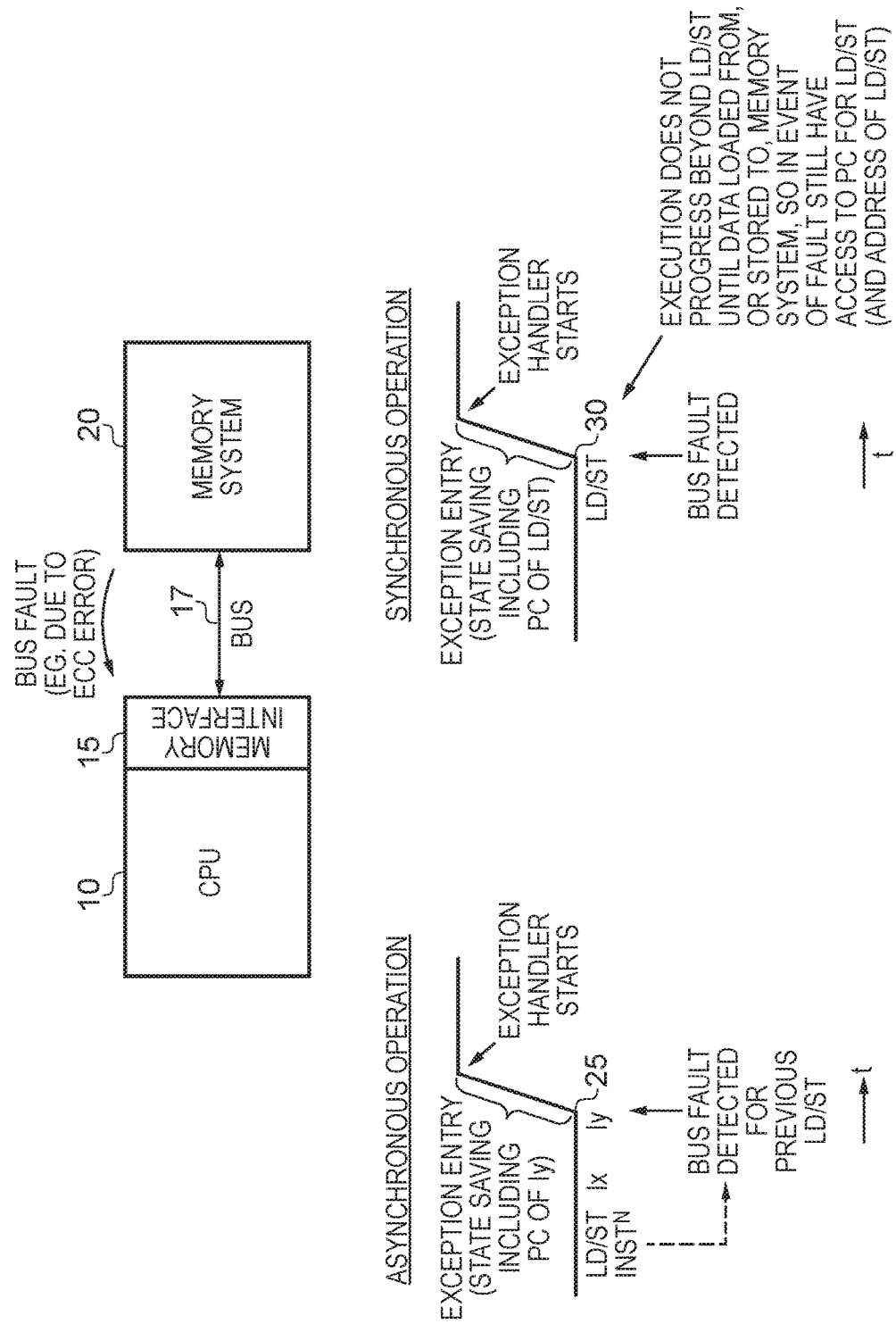
FIG. 1 is a diagram illustrating the difference between asynchronous fault handling and synchronous fault handling.

Before discussing the embodiments with reference to the accompanying figures, the following description of embodiments is provided.

Whilst it may generally be desirable for performance and implementation reasons to operate processing circuitry such that faults resulting from memory access operations that occur externally to the processing circuitry are reported asynchronously, situations can arise where such asynchronous reporting of faults causes significant problems to arise. For example, in systems where multiple different applications and/or exception handling routines may be executed, it may in some situations not be possible, or at least can be very problematic, to identify the "owner" of the fault, i.e. which particular application code or exception handling code executed a memory access instruction that gave rise to the fault when the associated memory access operation was processed by the memory system.

In accordance with the techniques described herein, the processing circuitry is arranged so that it can be operated in either a synchronous fault handling mode or an asynchronous fault handling mode, and can be arranged to switch between the synchronous fault handling mode and the asynchronous fault handling mode during execution of the program instructions, in dependence on a current context of the processing circuitry. When in the synchronous fault handling mode, the processing circuitry applies a constraint on execution of the program instructions such that a fault resulting from a memory access operation processed by the memory system will be received by the memory interface that is coupled to the processing circuitry, before the processing circuitry has allowed program execution to proceed beyond a recovery point for the memory access instruction associated with the memory access operation. In contrast, when in the asynchronous fault handling mode, the processing circuitry removes that constraint.

Such an approach has significant benefits, as it allows the processing circuitry to switch to the synchronous fault handling mode for particular periods of time where it is felt appropriate to have access to the information that can remove ambiguity as to the owner of the fault. However, in other situations, the processing circuitry can be operated in the asynchronous fault handling mode so as to allow the associated performance improvements to be realised.

There are a number of ways in which the current context can be categorised so as to indicate when the processing circuitry should switch between the two different fault handling modes. However, in one embodiment, the processing circuitry is arranged to switch to the synchronous fault handling mode when executing program instructions identified as being within a critical code portion, and to otherwise operate in the asynchronous fault handing mode. Hence, the processing circuitry will generally operate in the asynchronous fault handling mode so as to achieve the higher performance obtainable by handling fault reporting asynchronously, but for certain critical code portions will switch to the synchronous fault handling mode, where performance is sacrificed in order to enable the processing circuitry to have access to the necessary state information to clearly identify which piece of code executed a memory access instruction that gave rise to the fault occurring.

The critical code portion can take a variety of forms. In one embodiment, the processing circuitry is arranged to execute application code and exception handling code, and the processing circuitry is arranged to switch to the synchronous fault handling mode when executing at least one type of exception handling code. Hence, the critical code portions can be considered to be one or more types of exception handling code. For example, certain exception handling code can be considered to be critical exception handlers, for example a HardFault exception handler, or a non-maskable interrupt (NMI) exception handler. Whilst such exception handling code is being executed, the processing circuitry will operate in the synchronous fault handling mode, whereas otherwise it will operate in the asynchronous fault handling mode.

There are a number of ways in which the trigger point for switching between the synchronous fault handling mode and the asynchronous fault handling mode can be detected. In one embodiment, the processing circuitry has access to a plurality of exception handling routines, each exception handling routine having an associated priority level, and the apparatus further comprises control storage set to identify a mode switch priority level indication. The processing circuitry is arranged, when executing an exception handling routine, to compare the associated priority level with the mode switch priority level indication in order to determine whether to operate in the synchronous fault handling mode or the asynchronous fault handling mode whilst executing the exception handling routine. Hence, in such embodiments, the priority level of the exception handling routine will be compared with a mode switch priority level indication stored within control storage in order to decide which fault handling mode should be used whilst executing that exception handling routine. For example, if the associated priority level of the exception handling routine is greater than or equal to the mode switch priority level indication, then this may cause the exception handling routine to be executed in the synchronous fault handling mode, whereas otherwise it may be executed in the asynchronous fault handling mode.

In one embodiment, the processing circuitry operates in the asynchronous fault handling mode when executing the application code, so as to enable potential performance benefits to be realised when executing such application code.

In one embodiment, the processing circuitry may be configured to operate in a plurality of exception levels, and whether the processing circuitry operates in the synchronous fault handling mode or the asynchronous fault handling mode is dependent on which of the plurality of exception levels the processing circuitry is operating in.

In one embodiment, the decision as to which fault handling mode to use for each exception level can effectively be hardwired, so that the fault handling mode is predetermined for each exception level.

However, in an alternative embodiment the apparatus may further comprise control storage providing mode configuration information that is set to identify, for each exception level, which of the synchronous fault handling mode and the asynchronous fault handling mode should be used. This would hence allow the mapping between the exception levels and the fault handling modes to be altered over time, by updating the configuration information within the control storage, hence providing enhanced flexibility as to how the different fault handling modes are used.

In an alternative embodiment, the apparatus may further comprise control storage to identify a mode control value indicating which of the synchronous fault handing mode and the asynchronous fault handling mode the processing circuitry is to operate in. The processing circuitry is then responsive to a predetermined event to update the mode control value in the control storage. Hence, in such embodiments, whether the processing circuitry operates in the synchronous fault handling mode or the asynchronous fault handling mode is determined entirely by reference to the mode control value, and the mode control value can be updated as and when required in order to cause a change in the fault handling mode of the processing circuitry.

The predetermined event that causes the mode control value to be updated can take a variety of forms. For example, it may comprise execution of a dedicated mode switch instruction, which when executed by the processing circuitry causes the mode control value within the control storage to be updated. Following that update, then the processing circuitry will operate in the relevant fault handling mode as indicated by the updated mode control value.

Alternatively, or in addition, the predetermined event may comprise entry into at least one exception handling routine or exit from at least one exception handling routine. Hence, the update of the mode control value can be associated with entry into, and exit from, one or more exception handling routines. This for example would allow the processing circuitry to switch into the synchronous fault handling mode whilst executing certain critical exception handling routines, but otherwise to operate in the asynchronous fault handling mode.

In one embodiment, the mode control value forms state information preserved on entry to an exception handling routine so as to enable the mode control value to later be restored on exit from the exception handling routine. Hence, when state information is saved in respect of current code that was being executed at the point the exception was taken, that state information also includes the mode control value for that current code. This means that when processing in due course returns from the exception handling routine so as to once again begin executing that code, the mode control value associated with that code will automatically be restored as part of restoring of the state information that had been preserved.

The recovery point that program execution cannot proceed beyond whilst the processing circuitry is in the synchronous fault handling mode can take a variety of forms. However, in one embodiment, the program execution is considered to have proceeded beyond the recovery point for the memory access instruction when programmer visible state at the point of execution of the memory access instruction is unrecoverable from state information maintained by the processing circuitry. Hence, when in the synchronous fault handling mode, it is ensured that the state information maintained by the processing circuitry is sufficient to allow identification of the programmer visible state that was present at the point the memory access instruction was executed. The programmer visible state may be considered to be the register state and execution behaviour defined by the architecture for the processing circuitry and presented to a programmer of that processing circuitry for each instruction to act upon. Any given implementation need not represent or organise this state in the exact manner implied, and may at any point in time have a plurality of versions of this state representing either past or speculative future versions.

Hence, when in the synchronous fault handling mode, speculative execution can still be supported, but it is required that the programmer visible state at the point of execution of the memory access instruction can be recovered from at least one version of the state information being maintained by the processing circuitry, until such time as it can be determined that no fault has arisen when performing the associated memory access operation. Hence, whilst a certain degree of speculative execution may still take place whilst operating in the synchronous fault handling mode, execution will not typically be committed beyond the memory access instruction until it is clear whether a fault has occurred or not from the processing of the associated memory access operation by the memory system.

In some embodiments, the apparatus may include structures that allow one or more pending memory access operations to be identified, that are awaiting handling by the memory system. For example, store buffers may be used to hold details of pending store operations to the memory system. Typically, once a pending store operation has been entered into the store buffer, an acknowledgement can be sent back to the processing circuitry to allow the processing circuit to continue execution beyond the associated store instruction. In one embodiment, when switching from the asynchronous fault handling mode to the synchronous fault handling mode, the processing circuitry is arranged to perform a synchronisation barrier operation to ensure that any pending memory access operations are processed by the memory system before the processing circuitry switches to the synchronous fault handling mode. Hence, this effectively flushes any pending memory access operations from the apparatus so as to ensure that any faults associated with those memory access operations are identified before switching to the synchronous fault handling mode.

Hence, when the processing circuitry comprises at least one buffer for pending memory access operations, the synchronisation barrier operation may cause the content of any such buffers to be drained to the memory system.

In embodiments where the processing circuitry has access to a plurality of exception handling routines, the processing circuitry may be arranged, on entry to at least one of those exception handling routines, to perform the synchronisation barrier operation irrespective of whether the processing circuitry is switching to the synchronous fault handling mode. Hence, if desired, the synchronisation barrier operation can be triggered for certain fault handling routines even if processing is still being retained within the asynchronous handling mode. By such an approach, the chances of a fault being reported whilst executing that exception handling routine can be reduced, due to the flushing of the pending memory access operations prior to entering the exception handling routine.

It will be appreciated that the processing circuitry may have a number of other associated components, and some of those components can be arranged to operate differently dependent on whether the processing circuitry is in the synchronous fault handling mode or the asynchronous fault handling mode. For example, the processing circuitry may have an associated cache, and when the processing circuitry is in the synchronous fault handling mode, the cache may be arranged to be operated in a write-through mode. By operating the cache in a write-through mode rather than a write-back mode, this can force any data value updates made in the contents of the cache to be committed to memory at the same time, rather than waiting for a subsequent eviction of a cache line from the cache.

Particular embodiments will now be described with reference to the Figures.

FIG. 1 is a diagram illustrating the difference between asynchronous fault handling operation and synchronous fault handling operation within an apparatus of one embodiment. The apparatus includes processing circuitry, which in this example takes the form of a central processing unit (CPU) 10, that is coupled to a memory interface 15 via which it communicates over a bus network 17 with a memory system 20. The memory system 20 may include one or more hierarchical levels of memory, and hence for example could include one or more levels of cache (for example caches shared with other CPUs) and main memory. The CPU 10 is arranged to execute a sequence of instructions, and that sequence may include one or more memory access instructions that require memory access operations to be performed in respect of the memory system 20. For example, such a memory access instruction may be a load instruction which, when executed, causes a load operation to be performed in order to load from the memory system 20 data to be stored within one or more internal registers of the CPU 10. Alternatively, the memory access instruction may be a store instruction which, when executed, causes a store operation to be performed in order to store data from one or more working registers of the CPU into locations within the memory system 20.

When such load or store operations are performed within the memory system 20, it is possible that a fault could occur. The fault could occur for a variety of situations, but one example would be an error correction code (ECC) error. That fault is then reported as a bus fault back to the memory interface 15 from where it can be used to raise an exception within the CPU, causing an exception handling routine to be invoked. However, the ability to effectively deal with such faults can vary dependent on whether the CPU is operating in the synchronous fault handling mode or the asynchronous fault handling mode. When executing in the asynchronous fault handling mode, the CPU 10 is allowed to let execution of instructions be committed beyond the execution of a load or store instruction, before it can be guaranteed whether a bus fault has or has not been detected for the associated load or store operation. Accordingly, as is illustrated in the left-hand example of FIG. 1, if a bus fault is detected at point 25 in respect of an earlier load or store instruction, but the processing circuitry has committed execution beyond that load or store instruction, then at the time of exception entry the state saved may relate to the current instruction being executed, denoted in FIG. 1 as $I_y$. Hence, that state saving will include the program counter value for instruction $I_y$ amongst other information. When the exception handler subsequently starts, it will not have access to the program counter value for the load or store instruction that gave rise to the faulty load/store operation, and also will typically not have access to information about the memory address that was accessed in memory. This may mean that it is then necessary to restart the entire system in order to deal with the fault, which can have a significant performance impact. Nevertheless, assuming the occurrence of such faults is relatively low, significant performance benefits can be realised by operating processing circuitry in the asynchronous mode, due to the general instruction throughput improvements that can be realised.

In contrast, when operating the processing circuitry in the synchronous fault handling mode of operation, the CPU is prevented from committing execution of the instruction sequence beyond the load/store instruction until it can be confirmed that no bus fault has been detected. Accordingly, as indicated in the right-hand side of FIG. 1, if at point 30 a bus fault is detected, the processing circuitry still has all of the relevant state information relating to the execution of the load/store instruction, and accordingly on exception entry can save that state. This will include the program counter value of the load/store instruction, and also may include the memory address accessed by that load/store instruction. Then when the exception handler starts, it is able to identify the source of the fault, and perform a suitable recovery operation based on that information. This can typically avoid the need to restart the entire system, and hence enable the fault to be handled more expediently. However, when running the processing circuitry in the synchronous fault handling mode of operation, it is not possible to take advantage of the potential instruction throughput benefits arising from operating in the asynchronous fault handling mode, and hence whilst faults can be better handled when they arise, the overall performance may be significantly impacted.

It should be noted that the schematics in FIG. 1 are simplified schematics, and in many real world applications the apparatus may be able to operate at multiple different exception levels, allowing an exception to be taken partway through handling of another exception. This can give rise to a number of nested exceptions. When operating in the asynchronous mode of operation, this may mean that an exception handler at a particular exception level may not be able to work out which portion of code included the load/store instruction that gave rise to the fault, i.e. whether that code was application code or one of the lower levels of exception handling code. Often in such situations, there is no choice but to restart the entire system when such a fault is detected.

In accordance with the embodiments described herein, a mechanism is provided to allow the processing circuitry to switch between operating in an asynchronous fault handling mode and a synchronous fault handling mode. The trigger point for the switch can be configured in a variety of ways, but in one embodiment it is envisaged that the processing circuitry will typically operate in the asynchronous fault handling mode so as to obtain the performance benefits achievable by operating in that mode of operation, but when executing certain critical code portions the processing circuitry will switch into the synchronous fault handling mode, in order to benefit from the improved fault handling capabilities achievable when operating in the synchronous fault handling mode. Those critical code portions may for example be one or more exception handling routines.

Figure 2:
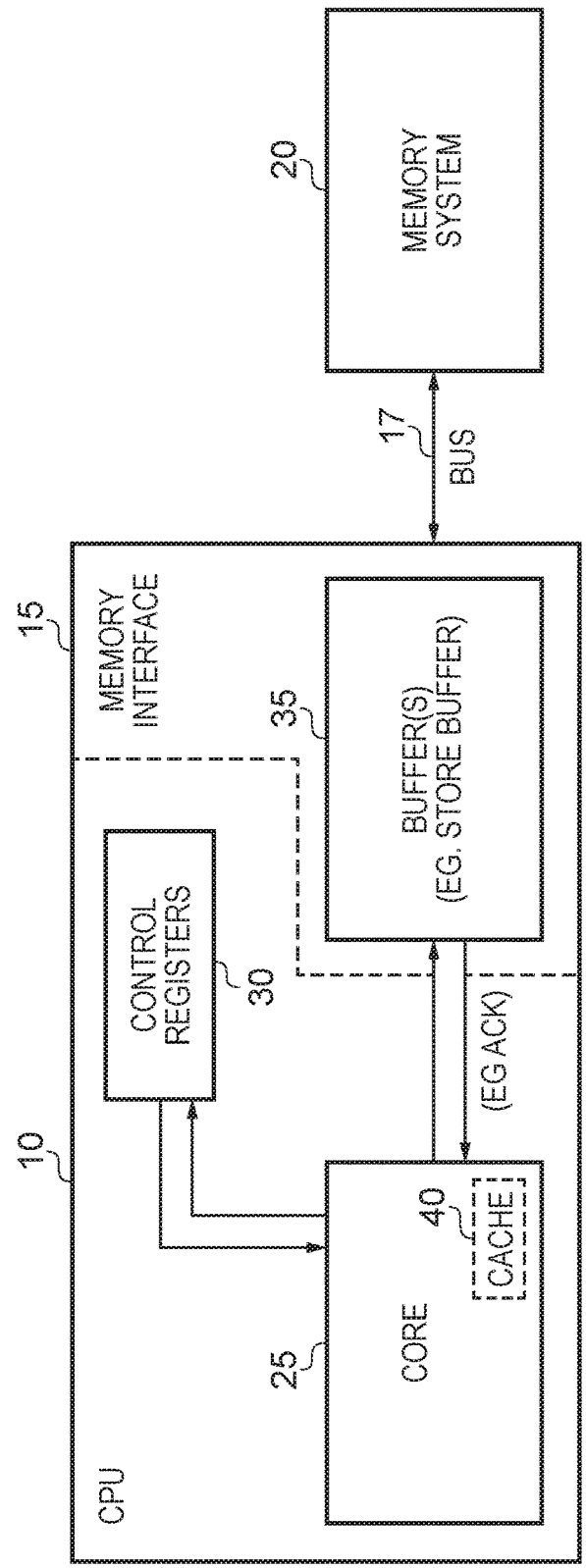
FIG. 2 is a block diagram of an apparatus in accordance with one embodiment.

FIG. 2 is a block diagram illustrating an apparatus in accordance with one embodiment. The CPU 10 includes a processor core 25 arranged to execute a stream of program instructions fetched from the memory system 20. The core 25 may have associated therewith one or more local caches 40 for storing instructions fetched from memory and/or for storing data values manipulated by the core during execution of those instructions.

The CPU 10 also includes some control registers 30 that provide control information used to control the operation of the processor core 25. In one embodiment, information in the control registers 30 is used to specify to the core 25 which fault handling mode it should operate in, or to provide information to enable the core 25 to determine which fault handling mode to use at any particular point in time. Various different ways in which information may be specified to enable the core to determine the fault handling mode to operate in will be discussed later with reference to FIG. 4.

The CPU 10 is coupled to the bus 17 and memory system 20 via a memory interface 15. In one embodiment, the apparatus includes one or more buffers 35 in which information about pending access operations can be stored prior to that information being output over the bus 17 to the memory system 20. For example, one or more store buffers may be provided for storing information relating to store operations, so that the handling of those store operations by the memory system 20 can be decoupled from the activities of the core 25. In particular, once the core has issued the details of a store operation to the buffer 35, the buffer can issue an acknowledgement back to the core, at which point the core can continue processing beyond the store instruction, on the understanding that the store operation associated with that store instruction will be performed in due course by the memory system. This can increase the processing throughput of instructions by the processing core 25.

As will be appreciated by those skilled in the art, some CPUs can be arranged to perform in-order execution of instructions, whilst other CPU designs may allow out-of-order processing of instructions in order to seek to obtain further performance improvements. The earlier-mentioned store buffer mechanisms are often used in both in-order processors and out-of-order processors. In addition, out-of-order processors will also often include load queues which an also be considered to be provided within the buffers 35 shown in FIG. 2, allowing load operations to also be buffered. Whilst the use of such load queues is less common in in-order processors, it is still possible for scenarios to arise where the in-order processor core 25 commits execution of a load instruction before the associated load operation has actually been performed within the memory system, and hence before the data has been loaded into the required registers. For example, once the core has assessed any alignment criteria in relation to the specified load address, and any required memory protection checks (typically performed by a memory protection unit or a memory management unit with the CPU 10) have been passed, then it can commit execution of the load instruction, and effectively remove the associated state of that load instruction from its internally held state. Accordingly, if a subsequent bus fault occurs in respect of that load operation, this may still be reported asynchronously as a fault if the CPU is allowed to operate in the asynchronous fault handling mode.

Hence, in summary, when operating in the asynchronous fault handling mode, both store faults and load faults can be reported asynchronously whether the processor core is performing in-order execution or out-of-order execution of instructions.

In one embodiment, the buffers 35 can be considered to form part of the memory interface 15, but in other embodiments they may be considered to be part of the CPU, and themselves coupled to the memory interface 15.

Figure 3:
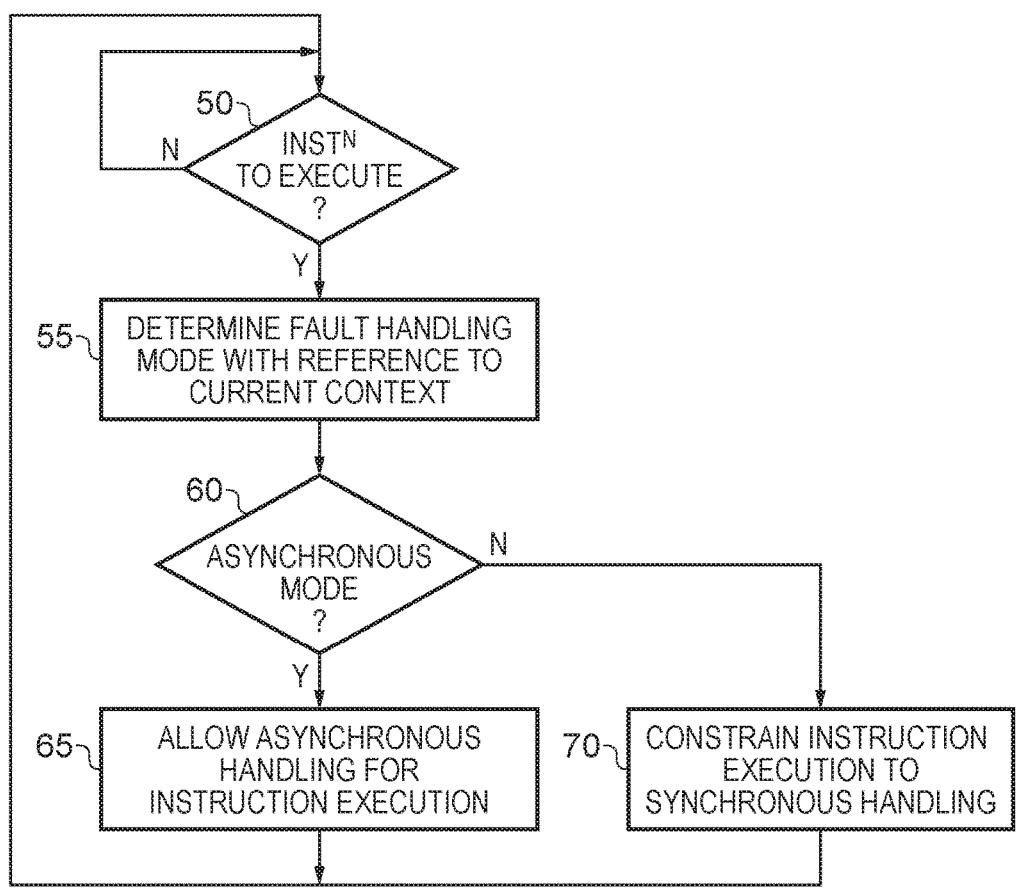
FIG. 3 is a flow diagram illustrating the operation of the apparatus in one embodiment.

FIG. 3 is a flow diagram illustrating steps performed by the processor core 25 during the execution of instructions. At step 50, it will be determined whether there is an instruction to execute. As each instruction is then executed, the process will proceed to step 55, where the processor core will determine the fault handling mode that it should operate in, with reference to the current context. As will be discussed in more detail later with reference to FIG. 4, the current context can be determined in a variety of ways, and may involve referencing information within the control registers 30 in order to determine the current context.

It will then be determined at step 60 whether the current context is such that the asynchronous fault handling mode of operation should be used or not. If so, then at step 65 the processor core allows asynchronous handling of faults in relation of execution of that instruction. Conversely, if at step 60 it is determined that the current context does not indicate that the asynchronous mode should be used, then the process proceeds to step 70 where instruction execution is constrained to ensure synchronous handling of faults. In particular, when in the synchronous fault handling mode, the execution of program instructions by the core 25 will be constrained so that any fault resulting from a memory access operation processed by the memory system 20 will be received by the memory interface 15 before the core 25 has allowed program execution to proceed beyond a recovery point for the memory access instruction associated with that memory access operation. Hence, in the synchronous fault handling mode the core retains sufficient state information that the programmer visible state at the point of execution of the memory access instruction can be recovered if a bus fault is received by the memory interface 15. It will be appreciated that this does not preclude the core from performing some degree of speculative execution of instructions, but it will be arranged not to commit execution beyond the point of execution of the memory access instruction, so that the required programmer visible state associated with that instruction is still recoverable if and when a bus fault occurs. Once the memory access operation has taken place, and no bus fault has been detected, then the core can allow execution to proceed beyond that recovery point since it is then known that that programmer visible state will no longer be required.

In one embodiment, the processor core 25 is arranged to execute not only application code, but also exception handler code, and each of the applications and exception handlers can have an associated exception level, or associated priority information. This is illustrated schematically in FIG. 4, where the applications 100 are assumed to be at an exception level or a priority level lower than the exception handlers 110. In addition, there may be certain critical exception handlers 120 that are at a higher exception level, or a higher priority level than the other exception handlers 110. The critical exception handlers can take a variety of forms, for example a HardFault exception handler or a non-maskable interrupt (NMI) exception handler.

In one embodiment, the context information can capture the exception level or priority information, with the use of the asynchronous fault handling mode or the synchronous fault handling mode then being determined dependent on that context.

FIG. 4 shows a variety of options that may be used when determining the fault handling mode at step 55 of FIG. 3. In accordance with a first option, the determination of the fault handling mode is directly a function of the exception level of the code being executed. This can effectively be hardwired for each exception level, to indicate whether the asynchronous fault handling mode or the synchronous fault handling mode should be used for that exception level.

As an alternative, and as shown by the second example in FIG. 4, the determination of the fault handling mode may be a function not only of the exception level but also of certain configuration information that can be set within the control registers 30 in association with each of the exception levels. This provides some additional flexibility, by allowing the control register information to be set to identify the appropriate fault handling mode for each exception level. For example, if it is determined that the current instruction is being executed by code at exception level two, and the relevant configuration bit within the control registers 30 is set, this may identify that processing should be performed in the synchronous fault handling mode, whereas if the relevant configuration bit were clear this would indicate that processing should be performed in the asynchronous fault handling mode. Whilst in this example it is assumed that a "set" state indicates use of the synchronous fault handling mode, it will be appreciated that in an alternative embodiment the "set" state may indicate the use of the asynchronous fault handling mode.

In a yet further alternative arrangement, the code currently executing may have an associated priority, and a configuration field may be provided within the control registers 30 to identify a threshold priority level above which the synchronous fault handling mode is to be used. At step 55, it may then be determined, from a comparison of the current priority with the priority information in the configuration field, whether it is appropriate to operate in the synchronous fault handling mode or the asynchronous fault handling mode. For example, if the code is currently operating at priority level seven, and the configuration field identifies priority level six, then the processing circuitry may decide to operate in the synchronous fault handling mode of operation. It will be appreciated that the actual value set in the configuration field may indicate the level at which switching to the synchronous mode should take place (i.e. switch whenever the current priority is greater than or equal to the priority indicated in the configuration field), or may identify a priority level above which switching should take place (i.e. only switch to the synchronous fault handling mode if the current priority is greater than the value specified in the configuration field).

In a yet further example embodiment, the control registers 30 may include a mode state bit, which can be updated upon occurrence of predetermined events during operation of the CPU 10. These predetermined events can take a variety of forms. For example, the instruction sequence may be arranged to include explicit switch instructions which are executed in order to update the value of the mode state bit within the control registers. Following execution of such a mode switch instruction, the fault handling mode appropriate to subsequent execution instruction will then be determined from the updated mode state bit value. Alternatively, or in addition, the update of such a mode state bit may be encoded within the entry and exit procedures of particular exception handling routines, so that on entry to particular critical exception handling routines the apparatus can switch into the synchronous fault handling mode.

Figure 5:
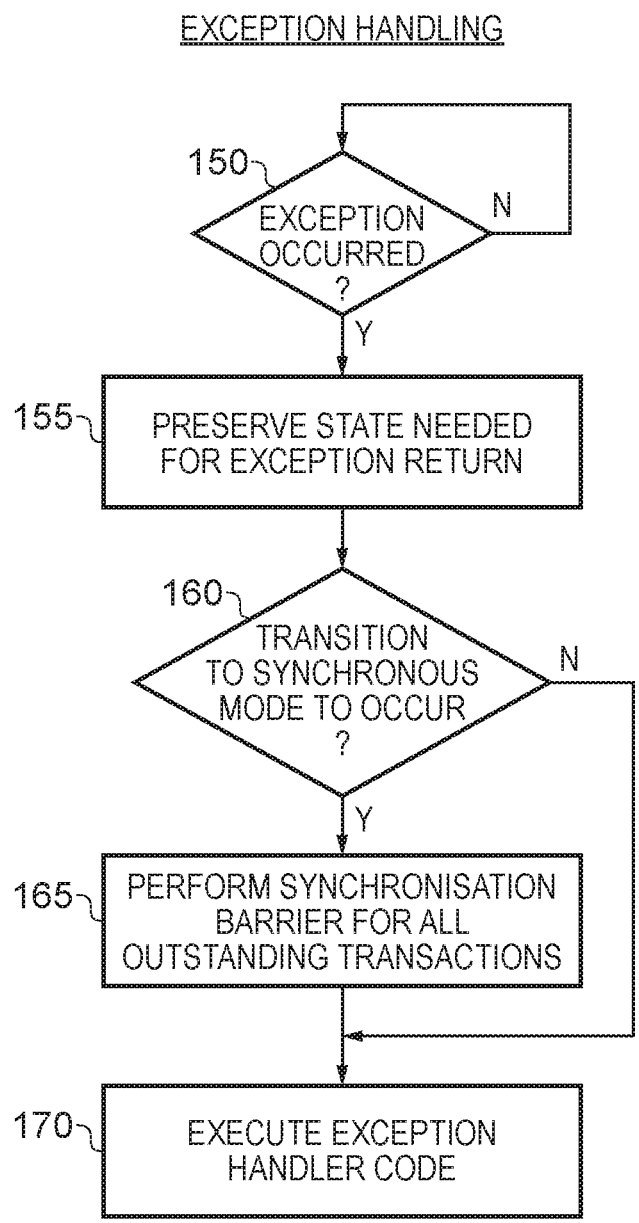
FIG. 5 is a flow diagram illustrating how exception handling is processed in accordance with one embodiment.

FIG. 5 is a flow diagram illustrating a general exception handling mechanism that can be used in one embodiment, independent of which of the options shown in FIG. 4 are used for determining whether the synchronous fault handling mode or the asynchronous fault handling mode should be used. At step 150, it is determined whether an exception has occurred, and when an exception does occur the state needed for returning from the exception is preserved at step 155. Thereafter, at step 160 it is determined whether the exception handler to be executed on exception entry should be processed in the synchronous fault handling mode. If not, then the process merely proceeds to step 170 where the exception handler code is executed. However, in one embodiment, if it determined that a transition to the synchronous fault handling mode is to occur, then at step 165 a synchronisation barrier operation is performed for all outstanding memory transactions. As a result of performing the synchronisation barrier operation, the buffers 35 will be drained so that all pending load or store operations are processed by the memory system before entry into the exception level where the exception handler code will be executed at step 170. This ensures that if any asynchronous faults will arise due to the pending transactions, those asynchronous faults will be detected before entry into the exception handler code. This means that when the exception handler code starts, it knows that any such asynchronous faults are not due to execution of its own instructions. This can be useful, as in some instances this may allow a process to be implemented to recover from such an asynchronously reported fault without needing to restart the entire system. For example, it may be necessary only to restart particular portions of code at lower exception levels than the exception handler being entered at step 170.

Once the process of FIG. 5 has been performed, and the exception handler code is then executed at step 170, it will be appreciated that any subsequent faults that arise during performance of load or store operations by the exception handler code will be reported synchronously, allowing a more ready recovery from those faults.

Whilst steps 160 and 165 of FIG. 5 have been shown in the context of entry to an exception handler at an exception level where synchronous fault handling is required, it will be appreciated that those steps can in principle be applied whenever it is decided to transition the CPU from the asynchronous fault handling mode to the synchronous fault handling mode, irrespective of whether that is due to entry to a particular exception handling routine. In particular, it can be useful to flush all pending transactions prior to entering into the synchronous fault handling mode, so that any asynchronously reported faults will be identified before entering into the synchronous fault handling mode of operation.

Figure 6:
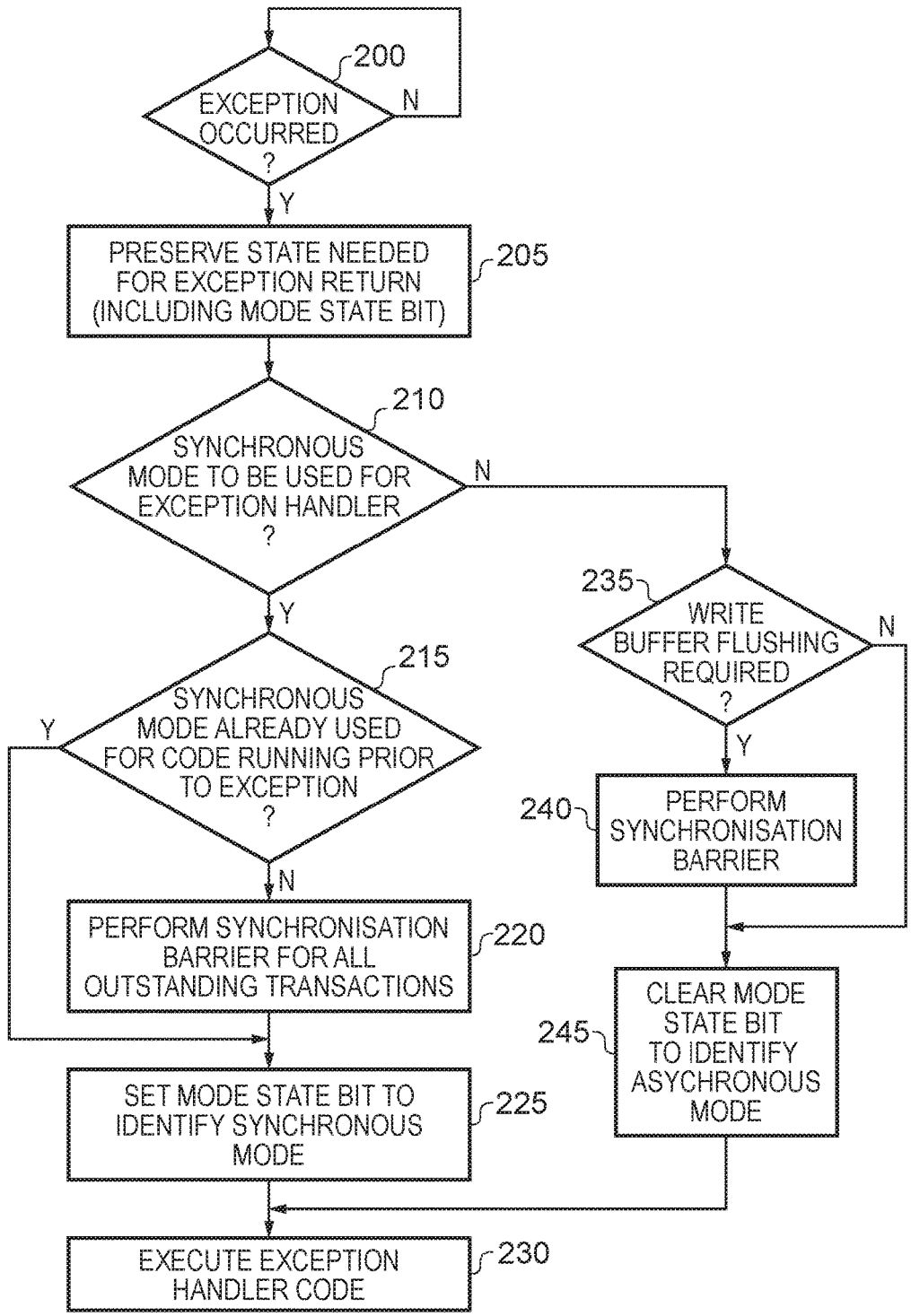
FIG. 6 is a flow diagram illustrating how exception handling is processed in accordance with one particular embodiment.

FIG. 6 is a flow diagram illustrating the steps performed when handling exceptions, for an embodiment where the mode state bit is used to identify whether operation should take place in the synchronous fault handling mode or the asynchronous fault handling mode. At step 200, it is determined whether an exception has occurred, and on occurrence of an exception the state needed for exception return is preserved at step 205. This will include the value of the current mode state bit associated with the code that was running prior to the exception occurring. At step 210, it will then be determined whether the synchronous mode is to be used for the exception handler that will be executed on exception entry. If so, it is then determined at step 215 whether the synchronous mode was already being used for the code running prior to the exception. If not, then a synchronisation barrier is performed for all outstanding transactions at step 220, prior to proceeding to step 225 where the mode state bit is set to identify the synchronous mode of operation. Thereafter the exception handler code is executed at step 230.

If at step 215 it is determined that the synchronous mode was already used for the code running prior to the exception, then in one embodiment it is determined to be unnecessary to reperform a synchronisation barrier, and instead the process proceeds directly to step 225 as shown in FIG. 6.

If it is determined at step 210 that the synchronous mode is not to be used for the exception handler, then in one embodiment the process can proceed directly to step 245 where the mode state bit is cleared to identify the asynchronous mode of operation, whereafter the exception handler code is executed at step 230. However, in an alternative embodiment there may be instances where it is still desired to perform a synchronisation barrier even if the synchronous mode is not being entered. In particular, at step 235, it can be determined whether write buffer flushing is required. For instance certain control information can be specified to identify whether on entry to a particular exception level write buffer flushing should be required even if not entering the synchronous fault handling mode of operation. If it is determined that write buffer flushing is required at step 235, then a synchronisation barrier is performed at step 240 prior to proceeding to step 245, whereas otherwise the process proceeds directly from step 235 to step 245.

In the example illustrated in FIG. 6, it is assumed that the only buffers provided are for store operations and not for load operations, and hence only store buffer (also referred to in FIG. 6 as write buffer) flushing is required.

Figure 7:
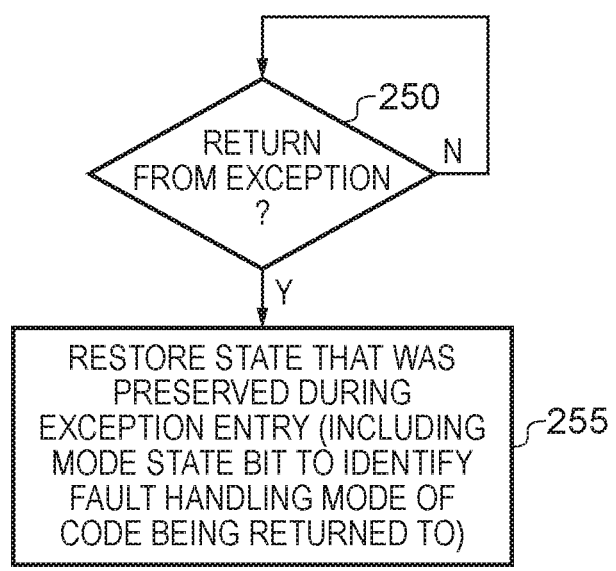
FIG. 7 is a flow diagram illustrating steps that may be taken when returning from an exception in accordance with the embodiment of FIG. 6.

FIG. 7 is a flow diagram illustrating exception return processing, when the earlier-mentioned mode state bit is used as the mechanism for identifying whether the CPU should operate in the synchronous fault handling mode or the asynchronous fault handling mode. At step 250, it is determined whether the process is returning from an exception. When it is determined that a return from the exception is to take place, then the state that was preserved during exception entry at step 205 is then restored at step 255. This will include the mode state bit to identify the fault handling mode of the code being returned to. Accordingly, this will ensure that the relevant control register is updated to identify the correct mode state bit value for the code being returned to, so that when the core 25 resumes execution of that code, it will correctly determine the appropriate fault handling mode of operation to be used.

From the above described embodiments, it will be seen that such embodiments provide an improved mechanism for handling faults during performance of memory access operations. In particular, in one embodiment the choice of whether the processor operates in a synchronous fault handling mode or an asynchronous fault handling mode can be changed dynamically at runtime based on a variety of factors, such as the exception level/handler that the CPU is currently running in. In addition, synchronisation barriers can optionally be enforced prior to entry to the synchronous fault handling mode of operation, so as to flush any pending transactions and identify any associated asynchronously reported faults prior to beginning executing exception handler code in the synchronous fault handling mode of operation.

In one particular implementation, the CPU may be provided with auxiliary control bits to enable its associated write buffer to be disabled, which can bring about the effect of making all store operations report synchronous errors, rather than those that would go through the write buffer being able to produce asynchronous errors. In one embodiment, such auxiliary control bits can be set and cleared dynamically on entry to, or exit from, certain exception handling routines, such as critical exception handlers, for example HardFaults exception handlers or NMI exception handlers. Additionally, entry to particular exception handlers may force the write buffer to be flushed, and any fault recognised, before entering certain exception handlers, e.g. a SecureFault exception handler, such that there is no ambiguity as to the "owner" of the fault.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

I claim:
1. An apparatus comprising:
processing circuitry to execute program instructions including memory access instructions; and
a memory interface to couple the processing circuitry to a memory system;
the processing circuitry being switchable between a synchronous fault handling mode and an asynchronous fault handling mode, when in the synchronous fault handling mode the processing circuitry applying a constraint on execution of the program instructions such that a fault resulting from a memory access operation processed by the memory system will be received by the memory interface before the processing circuitry has allowed program execution to proceed beyond a recovery point for the memory access instruction associated with said memory access operation, and when in the asynchronous fault handling mode the processing circuitry removing said constraint;
the processing circuitry arranged to switch between the synchronous fault handling mode and the asynchronous fault handling mode during execution of the program instructions, in dependence on a current context of the processing circuitry;
wherein the processing circuitry is arranged to switch to the synchronous fault handling mode when executing program instructions identified as being within a critical code portion, and to otherwise operate in the asynchronous fault handing mode.

2. An apparatus as claimed in claim 1, wherein the processing circuitry is arranged to execute application code and exception handling code, and the processing circuitry is arranged to switch to the synchronous fault handling mode when executing at least one type of exception handling code.

3. An apparatus as claimed in claim 2, wherein the processing circuitry operates in the asynchronous fault handling mode when executing the application code.

4. An apparatus as claimed in claim 1, wherein the processing circuitry is configured to operate in a plurality of exception levels, and whether the processing circuitry operates in the synchronous fault handling mode or the asynchronous fault handling mode is dependent on which of the plurality of exception levels the processing circuitry is operating in.

5. An apparatus as claimed in claim 4, further comprising control storage providing mode configuration information that is set to identify, for each exception level, which of the synchronous fault handling mode and the asynchronous fault handling mode should be used.

6. An apparatus as claimed in claim 1, further comprising:
control storage to identify a mode control value indicating which of the synchronous fault handing mode and the asynchronous fault handling mode the processing circuitry is to operate in; and
the processing circuitry is responsive to a predetermined event to update the mode control value in the control storage.

7. An apparatus as claimed in claim 6, wherein said predetermined event comprises at least one of:
execution of a mode switch instruction;
entry into at least one exception handling routine or exit from at least one exception handling routine.

8. An apparatus as claimed in claim 1, wherein the program execution is considered to have proceeded beyond the recovery point for the memory access instruction when programmer visible state at the point of execution of the memory access instruction is unrecoverable from state information maintained by the processing circuitry.

9. An apparatus as claimed in claim 1, wherein:
when switching from the asynchronous fault handling mode to the synchronous fault handling mode, the processing circuitry is arranged to perform a synchronisation barrier operation to ensure that any pending memory access operations are processed by the memory system before the processing circuitry switches to the synchronous fault handling mode.

10. An apparatus as claimed in claim 9, wherein:
the processing circuitry has access to a plurality of exception handling routines, and the processing circuitry is arranged, on entry to at least one of those exception handling routines, to perform the synchronisation barrier operation irrespective of whether the processing circuitry is switching to the synchronous fault handling mode.

11. An apparatus as claimed in claim 1, wherein the processing circuitry has an associated cache, and when the processing circuitry is in the synchronous fault handling mode, the cache is arranged to be operated in a write through mode.

12. An apparatus comprising:
processing circuitry to execute program instructions including memory access instructions; and
a memory interface to couple the processing circuitry to a memory system;
the processing circuitry being switchable between a synchronous fault handling mode and an asynchronous fault handling mode, when in the synchronous fault handling mode the processing circuitry applying a constraint on execution of the program instructions such that a fault resulting from a memory access operation processed by the memory system will be received by the memory interface before the processing circuitry has allowed program execution to proceed beyond a recovery point for the memory access instruction associated with said memory access operation, and when in the asynchronous fault handling mode the processing circuitry removing said constraint;
the processing circuitry arranged to switch between the synchronous fault handling mode and the asynchronous fault handling mode during execution of the program instructions, in dependence on a current context of the processing circuitry;
wherein:
the processing circuitry is arranged to execute application code and exception handling code, and the processing circuitry is arranged to switch to the synchronous fault handling mode when executing at least one type of exception handling code;
the processing circuitry has access to a plurality of exception handling routines, each exception handling routine having an associated priority level;
the apparatus further comprises control storage set to identify a mode switch priority level indication; and
the processing circuitry is arranged, when executing an exception handling routine, to compare the associated priority level with the mode switch priority level indication in order to determine whether to operate in the synchronous fault handling mode or the asynchronous fault handling mode whilst executing the exception handling routine.

13. An apparatus comprising:
processing circuitry to execute program instructions including memory access instructions; and
a memory interface to couple the processing circuitry to a memory system;
the processing circuitry being switchable between a synchronous fault handling mode and an asynchronous fault handling mode, when in the synchronous fault handling mode the processing circuitry applying a constraint on execution of the program instructions such that a fault resulting from a memory access operation processed by the memory system will be received by the memory interface before the processing circuitry has allowed program execution to proceed beyond a recovery point for the memory access instruction associated with said memory access operation, and when in the asynchronous fault handling mode the processing circuitry removing said constraint;
the processing circuitry arranged to switch between the synchronous fault handling mode and the asynchronous fault handling mode during execution of the program instructions, in dependence on a current context of the processing circuitry;
the apparatus further comprising:
control storage to identify a mode control value indicating which of the synchronous fault handing mode and the asynchronous fault handling mode the processing circuitry is to operate in; and
wherein:
the processing circuitry is responsive to a predetermined event to update the mode control value in the control storage; and
said mode control value forms state information preserved on entry to an exception handling routine so as to enable the mode control value to later be restored on exit from the exception handling routine.

14. An apparatus comprising:
processing circuitry to execute program instructions including memory access instructions; and
a memory interface to couple the processing circuitry to a memory system;
the processing circuitry being switchable between a synchronous fault handling mode and an asynchronous fault handling mode, when in the synchronous fault handling mode the processing circuitry applying a constraint on execution of the program instructions such that a fault resulting from a memory access operation processed by the memory system will be received by the memory interface before the processing circuitry has allowed program execution to proceed beyond a recovery point for the memory access instruction associated with said memory access operation, and when in the asynchronous fault handling mode the processing circuitry removing said constraint;
the processing circuitry arranged to switch between the synchronous fault handling mode and the asynchronous fault handling mode during execution of the program instructions, in dependence on a current context of the processing circuitry;
wherein:
when switching from the asynchronous fault handling mode to the synchronous fault handling mode, the processing circuitry is arranged to perform a synchronisation barrier operation to ensure that any pending memory access operations are processed by the memory system before the processing circuitry switches to the synchronous fault handling mode; and the processing circuitry comprises at least one buffer for pending memory access operations, and the synchronisation barrier operation causes content of said at least one buffer to be drained to the memory system.

15. A method of handing memory access operations in an apparatus having processing circuitry for executing program instructions including memory access instructions, and a memory interface to couple the processing circuitry to a memory system, the method comprising:

providing the processing circuitry with a synchronous fault handling mode and an asynchronous fault handling mode;

when in the synchronous fault handling mode, the processing circuitry applying a constraint on execution of the program instructions such that a fault resulting from a memory access operation processed by the memory system will be received by the memory interface before the processing circuitry has allowed program execution to proceed beyond a recovery point for the memory access instruction associated with said memory access operation;

when in the asynchronous fault handling mode, the processing circuitry removing said constraint; and switching between the synchronous fault handling mode and the asynchronous fault handling mode during execution of the program instructions, in dependence on a current context of the processing circuitry;

wherein:

the processing circuitry switches to the synchronous fault handling mode when executing program instructions identified as being within a critical code portion, and otherwise operates in the asynchronous fault handing mode.

\* \* \* \* \*